(No Model.) 2 Sheets—Sheet 1.
W. H. BERGER.
HAND TRUCK.
No. 394,442. Patented Dec. 11, 1888.
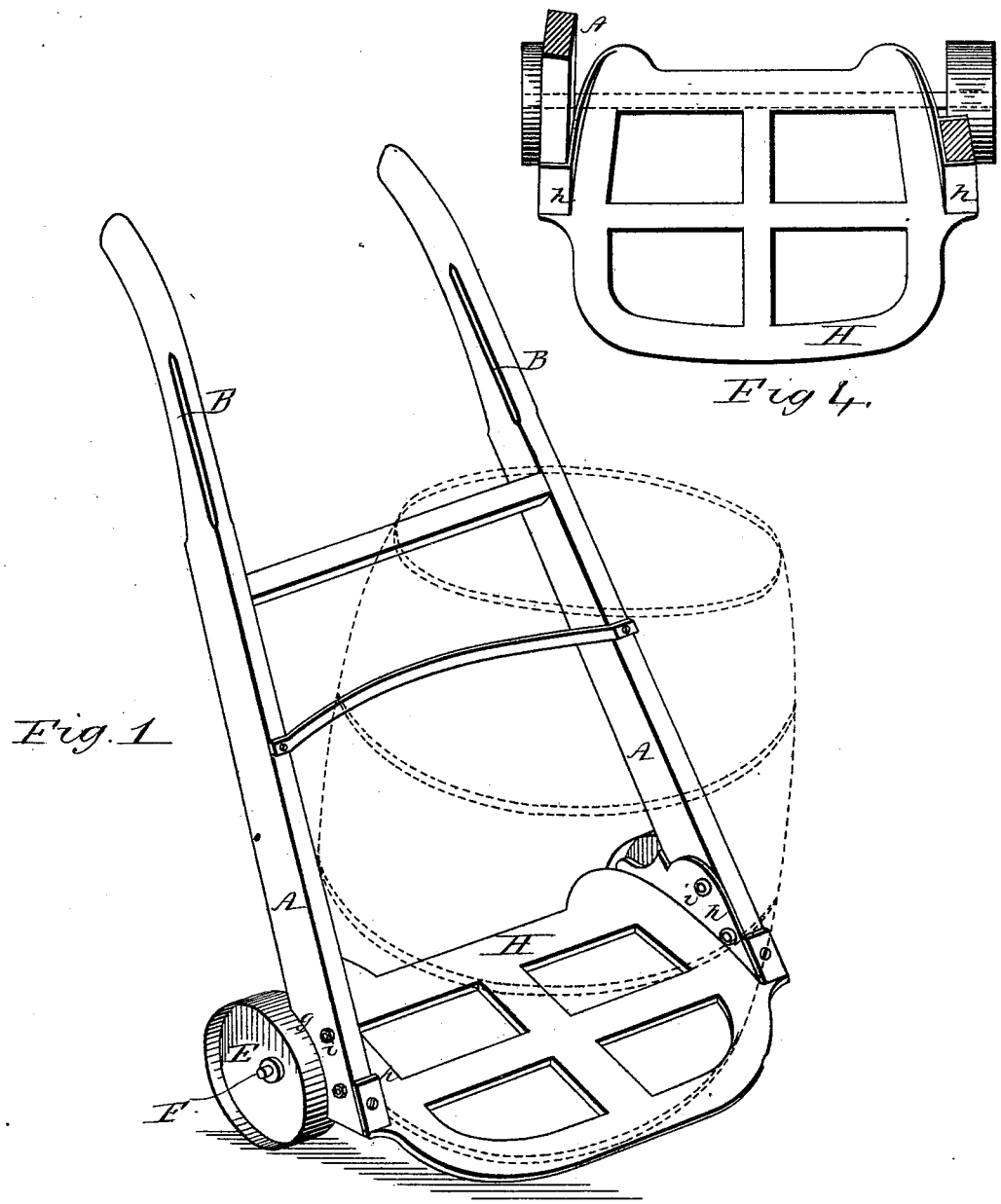
WITNESSES
G. Smith
A. B. Blackwood
INVENTOR
Wm. H. Berger,
By Connolly Bros.
Atty.

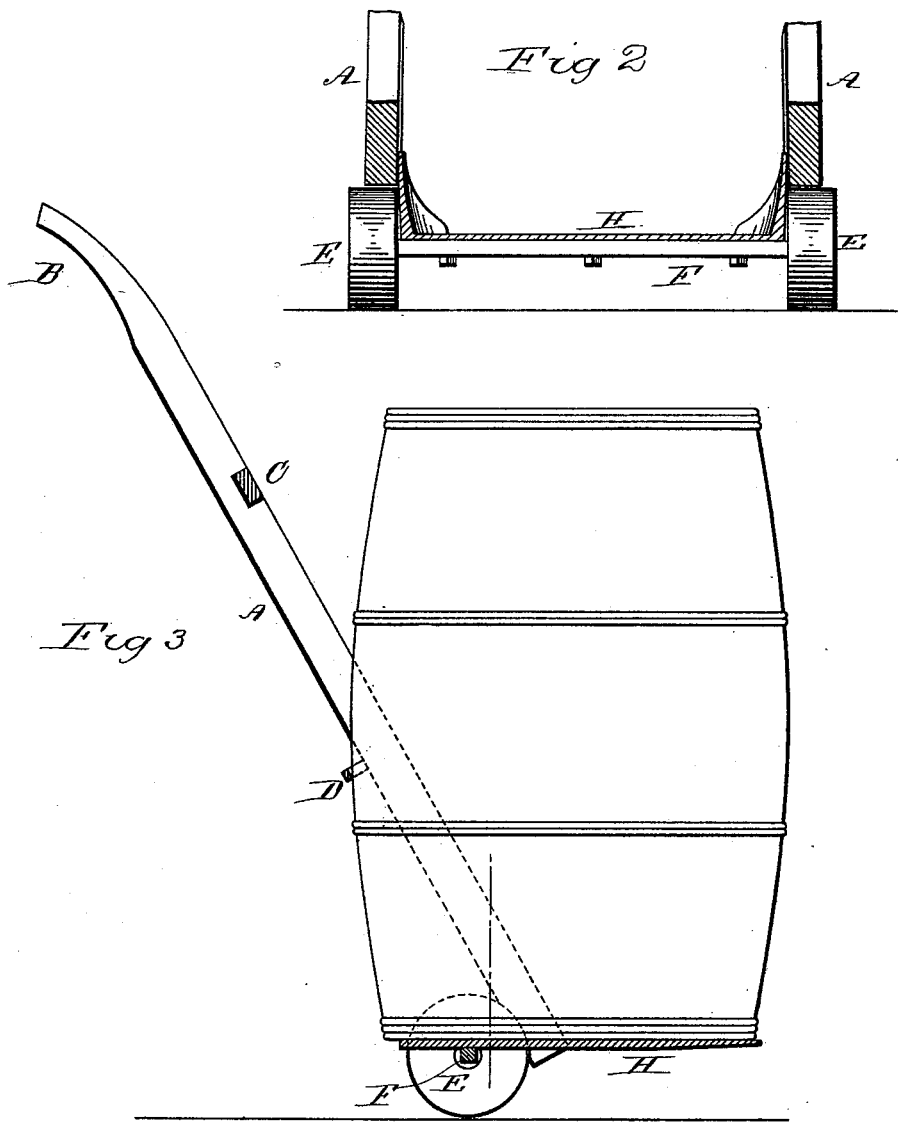

UNITED STATES PATENT OFFICE.

WILLIAM H. BERGER, OF PHILADELPHIA, PENNSYLVANIA.

HAND-TRUCK.

SPECIFICATION forming part of Letters Patent No. 394,442, dated December 11, 1888.

Application filed December 21, 1887. Serial No. 258,589. (No model.)

*To all whom it may concern:*

Be it known that I, WILLIAM H. BERGER, a citizen of the United States, residing at Philadelphia, in the county of Philadelphia and State of Pennsylvania, have invented certain new and useful Improvements in Hand-Trucks; and I do hereby declare the following to be a full, clear, and exact description of the invention, reference being had to the accompanying drawings, which form part of this specification.

This invention has relation to hand-trucks for use in stores, warehouses, and other departments, and has for its object the provision of a novel construction of truck which shall be more convenient to handle and better adapted for its purposes than the truck now in use.

The ordinary hand-truck consists of a low frame mounted on small wheels, one on either side near the forward end, and provided with handles which are extensions of the side bars of the frame. To the forward portion of the truck is secured a bent strip of wrought-iron of an approximately U shape, the transverse portion of which is arranged at an angle or on an oblique plane, and constitutes a toe or lip to aid in raising barrels or packages upon the frame and to facilitate depositing the same upon the ground or floor. This plate, lip, or toe is situated at or beyond the forward ends of the side bars of the frame, while the wheels are necessarily located in the rear, the shaft being journaled or fixed to the under side of the frame, and are entirely outside the bars.

In lifting and disposing of freight upon the truck the toe or lip is passed under the cask, box, or package while the truck is in a nearly upright position and the former then drawn over upon the frame. The truck is then lowered until the cask or package is properly balanced. To properly dispose of and arrange the freight upon the truck is a laborious and inconvenient operation, and to handle the truck with its load is inconvenient and unsatisfactory. The weight is in a great measure imposed upon the arms of the truckman, and, besides being unwieldy, is insecure, frequently causing the packages to tilt over, or, if open, to lose their contents.

My improvements contemplate, among other advantages, so constructing the truck that it may be easily loaded, unloaded, and handled, and so that the weight, while being disposed to the best advantage, will be borne upon the wheels of the truck, and may be moved while the truck is in an elevated position without disturbing the upright position of casks, barrels, and other objects which it may not be desirable to tilt.

My invention consists in the novel construction, combination, and arrangement of parts, as hereinafter described and claimed.

In the drawings, Figure 1 is a perspective view of a truck embodying my improvements. Fig. 2 is a transverse sectional view on line *x x* of Fig. 3. Fig. 3 is a longitudinal section of my improved truck. Fig. 4 is a plan view of lower part of truck.

A A designate the side bars of the truck, extending rearwardly to form handles B B. These bars are rectangular in cross-section, where they constitute the frame of the truck, and are connected together by a transverse wooden beam, C, and an inwardly-curved iron rod, D, as usual in truck-frames.

E E are the wheels, and F the axle. The latter is situated a few inches back of the forward ends of the side bars, and the latter are preferably cut out at *g g*, so that the wheels may be brought closer together and the truck-frame set sufficiently low.

The principal feature of my invention lies in the plate H, which takes the place of the ordinary toe or lip plate now in use on trucks. This plate, as will be seen, instead of being simply a lip or flange extending beyond the ends of the frame, is a platform which extends back between the side bars and some distance behind or below them and over the axle. To accommodate this platform and enable it to properly serve the purposes, the bars A A are separated more than in the ordinary truck, so as to admit between them a barrel or cask while standing upright upon the platform, and dispose of the weight of the barrel or cask above and on both sides of the axle, and thus practically balance the truck.

The platform H is preferably a casting of iron, and is conveniently attached to the frame by being cast with sockets *h h*, which receive the ends of the frame-bars A A.

As will be observed, and clearly indicated in Fig. 4 of the drawings, the side bars have a slight cant or inclination outward from their lower to their upper edges and they diverge toward the handle ends. This inclination or cant is deemed advantageous, as it not only enlarges the space in which the cask or barrel sets toward the swell or belly of the latter, but in casting the platform the corresponding inclination of the socket-walls facilitates the withdrawal of the pattern from the mold. Again, it will be seen that while from the surface of the platform to the upper edges of its side walls there is a divergence in the latter the platform is contracted toward its inner edge. This peculiarity is in a measure necessitated by the requirements of convenience and expediency, and need not be dwelt upon as special elements of invention. By reason of the cant given to the bars the handles diverge, but not to an inconvenient extent.

The platform is secured to the side bars by transverse bolts $i$ $i$, and from the socket portions the forward edge of the platform curves outward, so as to avoid abrupt angles or obstructions.

In using the truck for freight, and particularly for barrels or casks, the truck is lifted to a nearly upright position, so that the front edge of the platform, resting on the ground, may be passed under the barrel, cask, or box. The latter is then drawn over upon the platform until a portion of the weight is over or back of the axle. This establishes a proper equilibrium or balance, and allows the truck to be moved with great ease and without necessitating its being lowered or the freight tilted or otherwise unduly disturbed. All that is necessary is to tilt the truck sufficiently to cause the platform to assume a horizontal position, which will bring the handles to a convenient position. The freight may be readily disposed or removed by simply elevating the handles and allowing the cask or box to tilt forward, after which the truck is drawn back.

Having described my invention, what I claim, and desire to secure by Letters Patent, is—

1. In a hand-truck, the combination, with wheels E E and axle F, of the platform H, secured to said axle and extending back of the same, and the handles A A, secured to said platform forward of the axle and at an angle to the top surface of the same, substantially as described.

2. In a hand-truck, the combination, with the wheels E E, axle F, and platform H, secured to said axle, extending back of the same and from wheel to wheel, of the handles A A, secured to said platform in front of the said wheels, substantially as described.

3. In a hand-truck, the combination, with the side bars of the frame, having an outward cant or inclination, of a platform extending between their forward ends and above and rearwardly beyond the axle, said platform having side flanges or sockets which converge toward the rear edge of the platform, substantially as set forth.

4. In a hand-truck, the combination, with the axle F and wheels E E, mounted thereon, of the platform H and side bars, A A, said platform being secured to the axle and its flat surface extended back over and beyond the same, and said side bars secured to the platform forward of the wheels, whereby when a cask is placed on said platform and the latter turned upon its axle to a horizontal position the former will be partially balanced over said axle.

In testimony that I claim the foregoing I have hereunto set my hand this 12th day of December, 1887.

WILLIAM H. BERGER.

Witnesses:
  WILL H. POWELL,
  R. DALE SPARHAWK.